United States Patent
Keys

(10) Patent No.: US 6,951,361 B2
(45) Date of Patent: Oct. 4, 2005

(54) MOTORCYCLE PROTECTIVE COVER

(76) Inventor: Timothy J. Keys, 11772 Grazing Buck La., Tallahassee, FL (US) 32310

(*) Notice: Subject to any disclaimer, the term of this patent is extended or adjusted under 35 U.S.C. 154(b) by 0 days.

(21) Appl. No.: 11/018,307

(22) Filed: Dec. 21, 2004

(65) Prior Publication Data

US 2005/0146152 A1   Jul. 7, 2005

Related U.S. Application Data

(62) Division of application No. 10/751,542, filed on Jan. 5, 2004.

(51) Int. Cl.$^7$ ................................. B60J 1/00
(52) U.S. Cl. ..................... 296/77.1; 296/136.07; 296/78.1
(58) Field of Search ................. 296/77.1, 78.1, 296/136.07, 136.08, 136.01, 84.1; 114/55.57; 280/642, 304.4, 770; D12/402; 123/41.11

(56) References Cited

U.S. PATENT DOCUMENTS

| | | | | |
|---|---|---|---|---|
| 1,292,610 A | * | 1/1919 | Jackson | 296/78.1 |
| 1,729,086 A | * | 9/1929 | Premont | 296/78.1 |
| 4,068,859 A | * | 1/1978 | Dittman | 280/304.4 |
| 4,283,084 A | * | 8/1981 | Gallagher | 296/78.1 |
| 4,378,747 A | * | 4/1983 | Beatty et al. | D12/307 |
| 4,655,497 A | * | 4/1987 | Mallett | 296/78.1 |
| 5,282,502 A | * | 2/1994 | Ballard | 296/78.1 |
| 5,458,390 A | | 10/1995 | Gilbert | |
| 5,490,549 A | | 2/1996 | Biette | |
| 5,511,822 A | | 4/1996 | Wolanski | |
| D370,457 S | * | 6/1996 | Dietz et al. | D12/402 |
| 5,562,139 A | * | 10/1996 | Cseri | 296/78.1 |
| 5,788,604 A | * | 8/1998 | Brown et al. | 280/642 |
| 5,791,718 A | | 8/1998 | Boutin | |
| 5,884,380 A | | 3/1999 | Thurm | |
| 5,979,966 A | * | 11/1999 | Suzuki | 296/78.1 |
| D423,432 S | * | 4/2000 | DeCaluwe et al. | 296/78.7 |
| 6,062,601 A | * | 5/2000 | Willie et al. | 280/770 |
| 6,120,083 A | | 9/2000 | Gunther | |
| 6,209,599 B1 | * | 4/2001 | Richardson | 296/136.07 |
| 6,231,104 B1 | * | 5/2001 | Roethel | 296/77.1 |
| 6,325,441 B1 | | 12/2001 | Ugolini | |
| 6,422,332 B1 | * | 7/2002 | Takata et al. | 180/68.3 |
| 6,733,038 B1 | * | 5/2004 | Prather | 296/136.7 |
| 2004/0051336 A1 | * | 3/2004 | Chiao et al. | 296/78.1 |

\* cited by examiner

Primary Examiner—Kiran B. Patel
(74) Attorney, Agent, or Firm—J. Wiley Horton

(57) ABSTRACT

A flexible protective cover which attaches over the forward surfaces of a motorcycle. The protective cover includes a central portion and two attached side flaps. The central portion fits over the forward surfaces of the upper cowling. The two side flaps fit over the sides of the lower cowling. The cover's upper portion is attached by slipping adjustable tabs around the stalks of the rear view mirrors. The lower portion is attached around the radiator opening. The trailing edges of the two side flaps may also be attached to the lower cowling. The invention optionally includes an integrated fender cover which slips over the motorcycle's front fender and lock around the two struts supporting the front wheel. With this device installed, all the forward-facing painted surfaces are protected from bug strikes and the like.

7 Claims, 14 Drawing Sheets

MOTORCYCLE PROTECTIVE COVER

CROSS-REFERENCES TO RELATED APPLICATIONS

This is a divisional application of U.S. application Ser. No. 10/751,542, filed Jan. 5, 2004.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of motorcycles. More specifically, the invention comprises a removable cover for protecting the forward surfaces of a motorcycle.

2. Description of the Related Art

FIG. 1 shows a motorcycle 10. There are many types currently in use. The one shown is a high-performance liquid-cooled type. An aerodynamic fairing encloses its forward portion. This is denoted in the view as upper cowling 26 and lower cowling 24. The upper and lower cowling may be made in multiple pieces or as one integral unit. The forward portion of upper cowling 26 opens into two air intakes 14. Headlight 12 (which may contain two or more bulbs) is located just above these.

A pair of turn signals 20 are located on the upper cowling, with one signal for each side. Likewise, a pair of mirrors 30 extend outward from the upper cowling. These mirrors are connected to the motorcycle by stalks 32. Windscreen 28 smoothly blends into the upper cowling.

Lower cowling 24 extends downward to the motorcycle's lower extreme. Radiator opening 22 is provided to allow air to flow into and through the radiator, which is located in the forward portion of lower cowling 24. The front wheel is immediately forward of the radiator opening. It is connected to the chassis by a pair of struts 16. Fender 18 is mounted over the front wheel to reduce spray.

Those skilled in the art will know that motorcycles such as the one shown in FIG. 1 are driven at high speed. When traveling down the highway they often experience bug strikes. Such strikes can be harmful to the finish on the upper and lower cowling, which often feature painted and highly polished surfaces. Thus, it is desirable to provide a protective covering for these surfaces.

BRIEF SUMMARY OF THE PRESENT INVENTION

The present invention comprises a flexible protective cover which attaches over the forward surfaces of a motorcycle. A motorcycle typically includes an upper cowling and a lower cowling. The upper cowling typically contains an air intake, a headlight, two turn signals, and two rear view mirrors. The lower cowling typically contains a radiator opening bounded by two side walls and a top wall.

The protective cover includes a central portion and two attached side flaps. The central portion fits over the forward surfaces of the upper cowling. The two side flaps fit over the sides of the lower cowling. The cover's upper portion is attached by slipping adjustable tabs around the stalks of the rear view mirrors. The lower portion is attached around the radiator opening. The trailing edges of the two side flaps may also be attached to the lower cowling.

The invention optionally includes an integrated fender cover which slips over the motorcycle's front fender and locks around the two struts supporting the front wheel. With this device installed, all the forward-facing painted surfaces are protected from bug strikes and the like.

Figure 1:
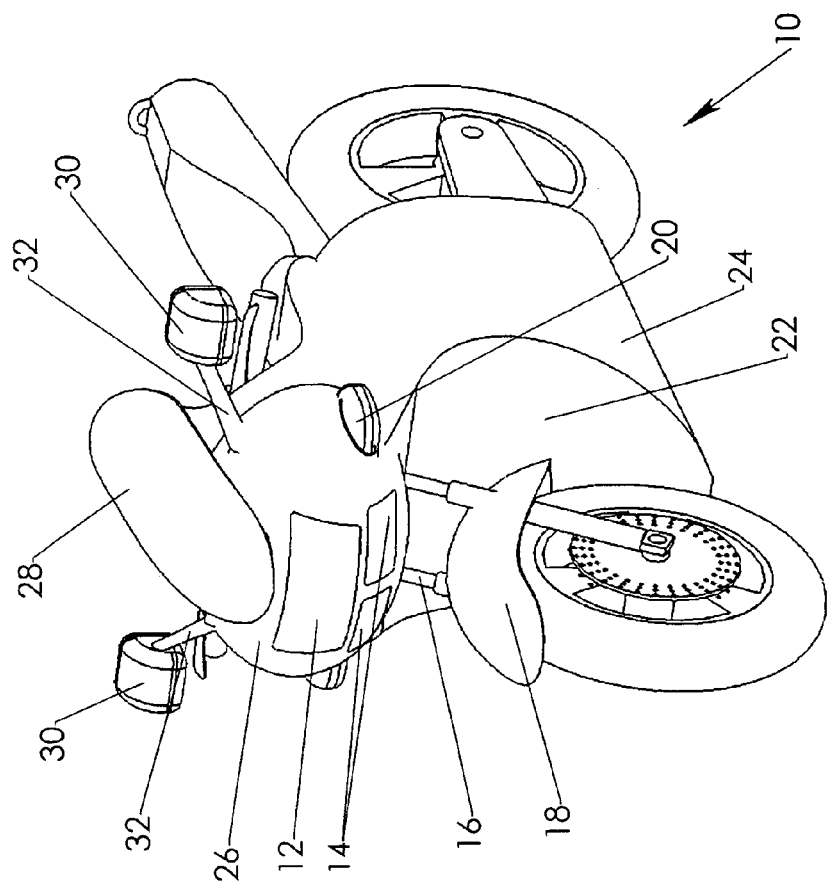
FIG. 1 is a perspective view, showing a prior art motorcycle.

REFERENCE NUMERALS IN THE DRAWINGS 10 air intake
12 headlight
14 air intake
16 strut
18 fender
20 turn signal
22 radiator opening
24 lower cowing
26 upper cowing
28 windscreen
30 mirror
32 stalk
34 cowing cover
36 headlight opening
38 air intake opening
40 turn signal opening
42 side flap
44 upper tab
46 stalk slot
48 hook tab
50 loop tab
52 outer surface
54 inner surface
56 loop block
58 hook block 60 top wall
62 side wall
64 lower edge
66 cowling side
68 upper corner
70 fender cover
72 strut slot
74 flap
76 hook tab
78 loop tab
80 tube section
82 main panel
84 central portion

DETAILED DESCRIPTION OF THE INVENTION

Figure 2:
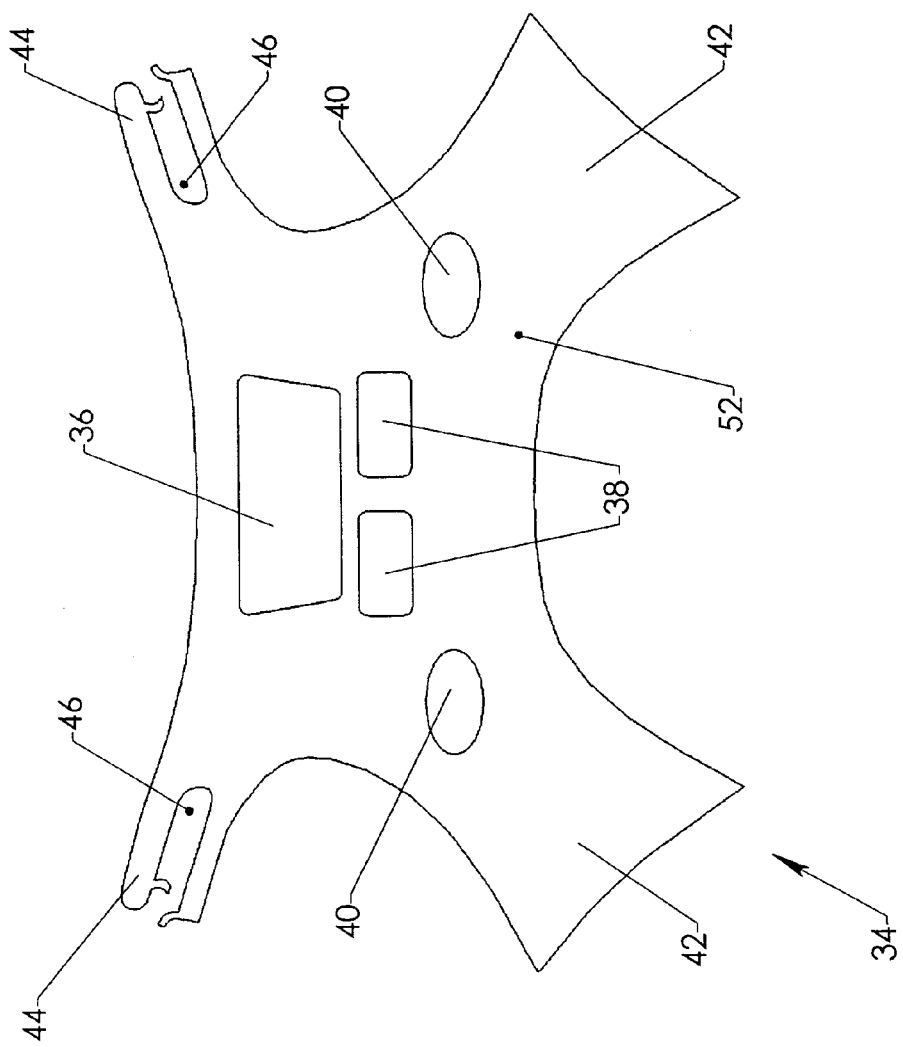
FIG. 2 is an isometric view, showing the present invention.

FIG. 2 shows the present invention laid out in a flattened state. Cowling cover 34 consists primarily of central portion 84 and two attached side flaps 42. The view shows the outward facing side of the device, donated as outer surface 52. Two turn signal openings 40 are provided near where central portion 84 joins the two side flaps 42.

Figure 3:
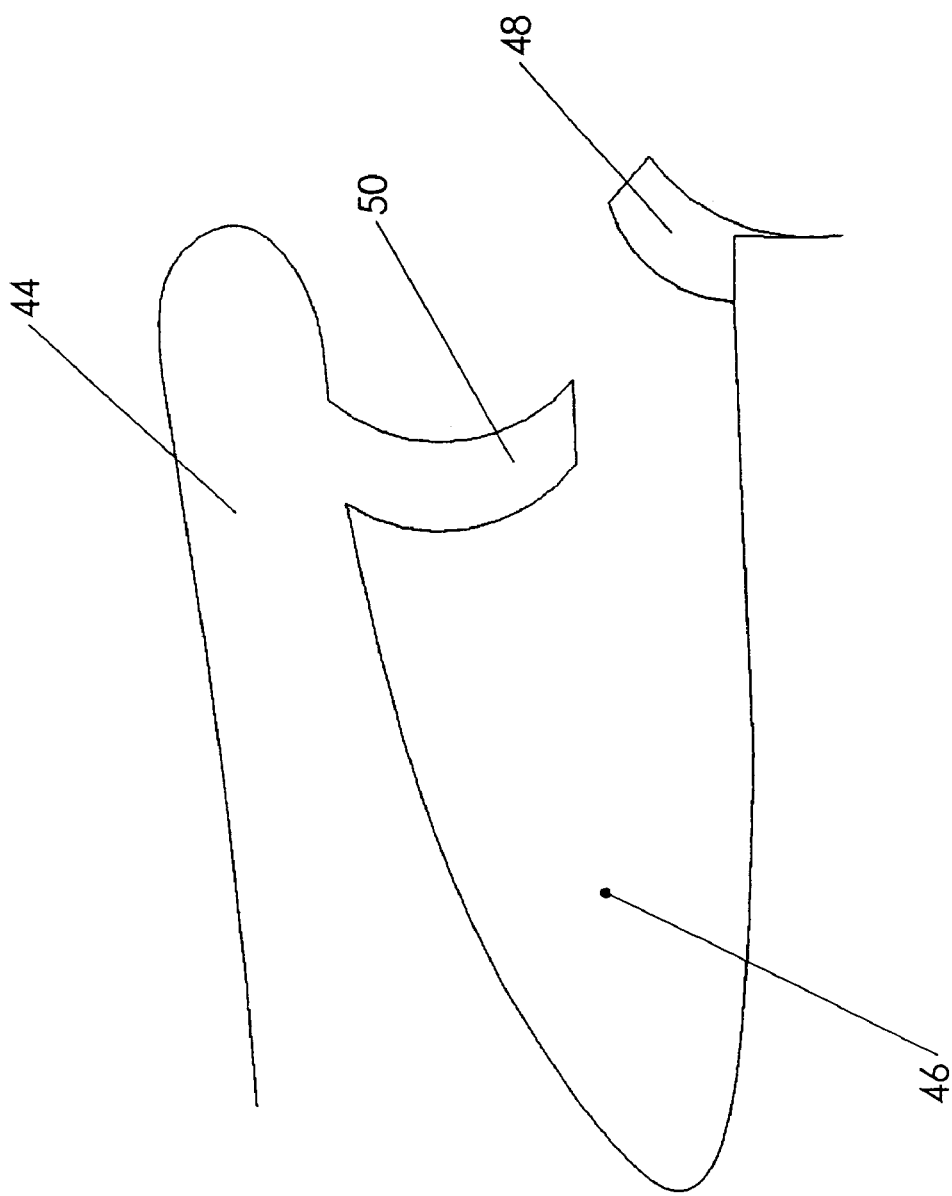
FIG. 3 is a detail view, showing the stalk slot.

Central portion 84 also includes a pair of air intakes 38 and headlight opening 36. Two stalk slots 46 are located near the upper corners of central portion 38. Each stalk slot 46 is bounded by an upper tab 44. FIG. 3 shows a stalk slot 46 in more detail. Loop tab 50 and hook tab 48 are located near the open mouth of stalk slot 46. These hook and loop fasteners (commonly known as VELCRO) can selectively close the open mouth of stalk slot 46. Those skilled in the art will also know that they provide considerable adjustment, the purpose of which will be explained subsequently.

Figure 4:
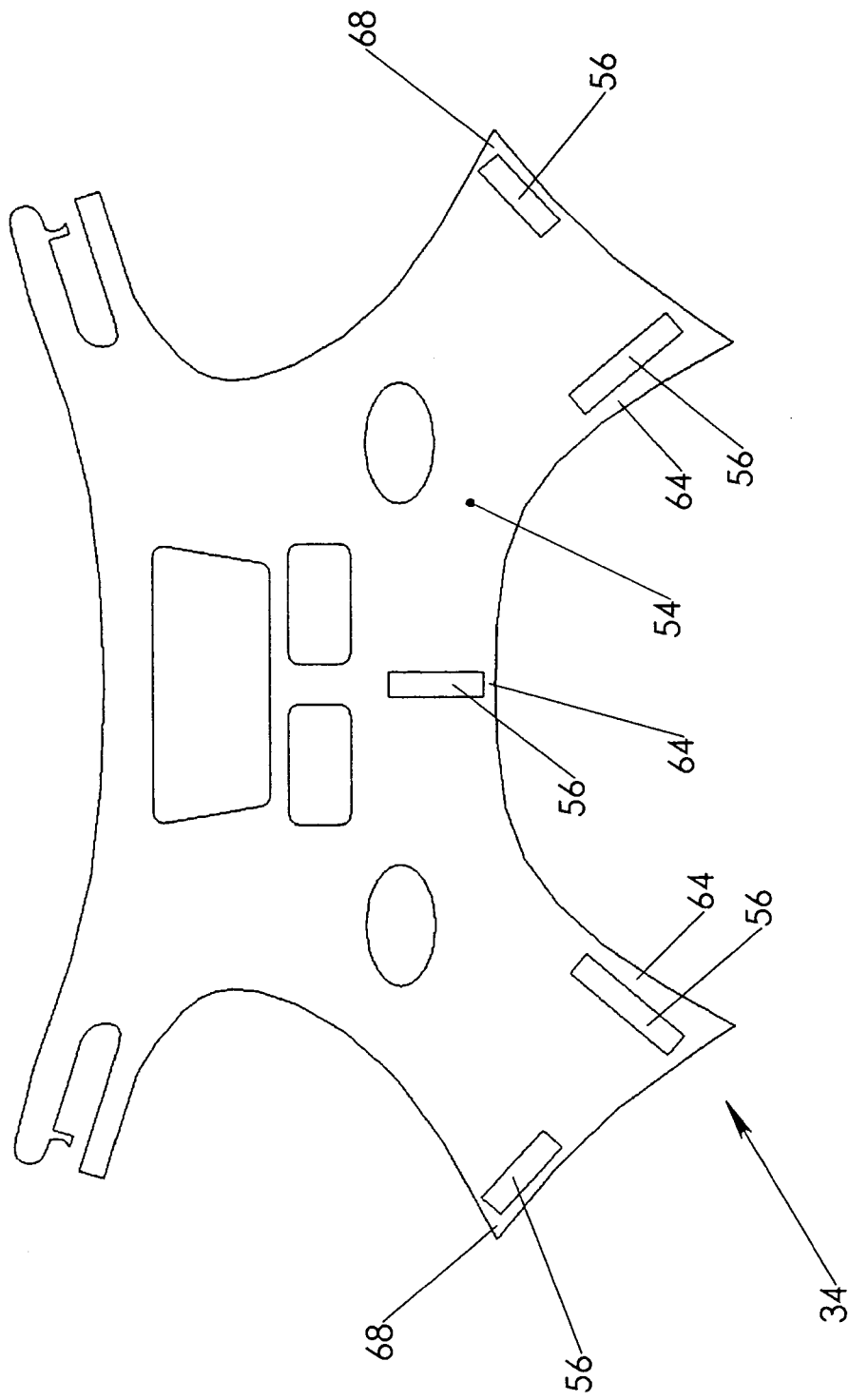
FIG. 4 is an isometric view, showing the inner surface of the present invention.

FIG. 4 shows cowling cover 34 flipped over to reveal inner surface 54 (The surface which customarily faces the motorcycle). The central portion and the two side flaps are bounded on their lower extremes by a continuous lower edge 64. A first loop block 56 is located near the right-hand extreme of lower edge 64 and a second loop block 56 is located near the left-hand extreme. Each loop block is a section of loop-type fastener material which is affixed to the cowling cover, such as by sewing, gluing, or other conventional means.

A third loop block 56 is located near the lower edge of the central portion. Two more loop blocks 56 are located in the two upper corners 68 of the two side panels. These loop blocks are positioned to mate with hook blocks affixed to the motorcycle. Of course, those skilled in the art will know that the hook and loop blocks can be reversed (the hook blocks on the cowling cover and the loop blocks on the motorcycle). It is also possible to substitute many other types of fasteners such as snaps.

Figure 5:
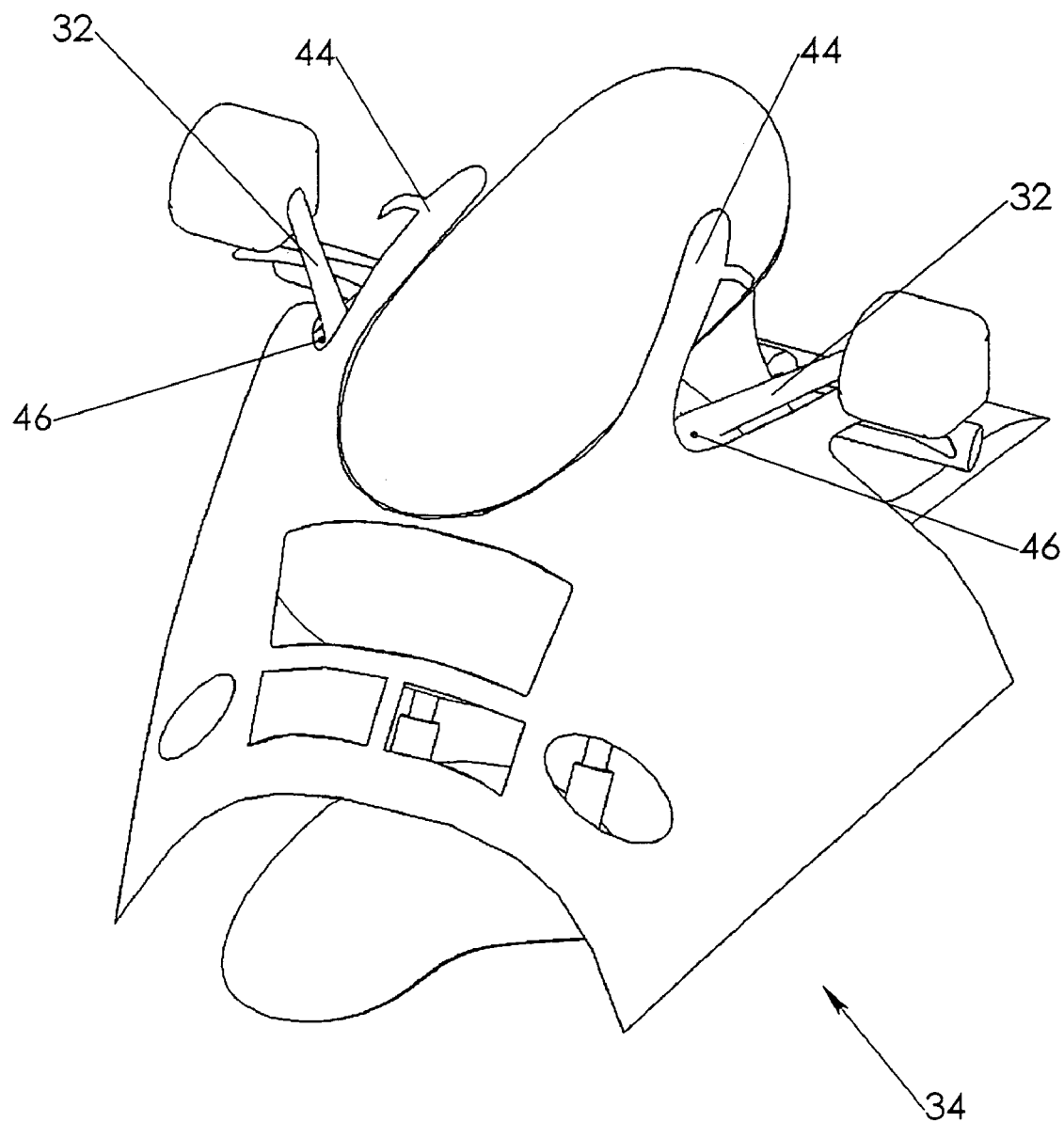
FIG. 5 is an isometric view, showing the installation of the present invention.

FIG. 5 shows the first step in the installation of the cowling cover. Cowling cover 34 is draped over the upper cowling as shown. The two stalk slots 46 are opened and the two upper arms 44 are passed over the two stalks 32. The cowling cover is allowed to rest in this position while the next step is performed.

Figure 6:
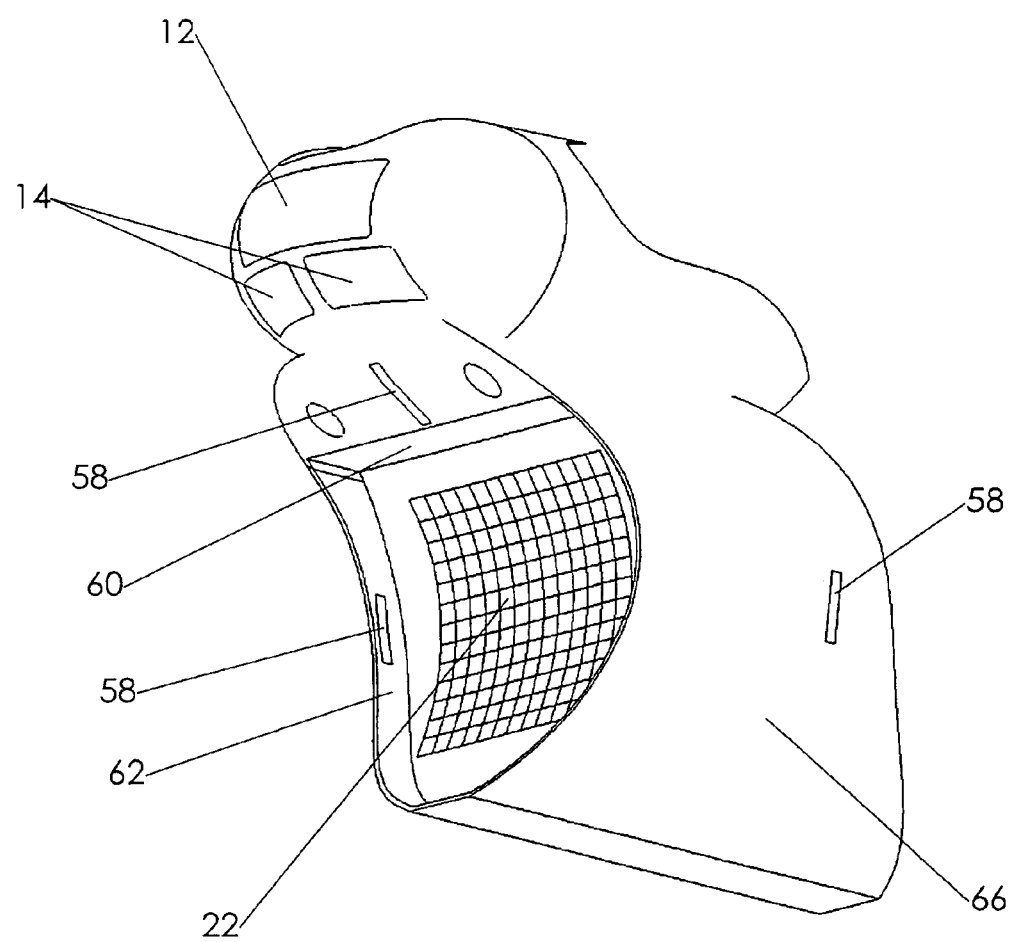
FIG. 6 is an isometric view, showing the location of mounting features on the motorcycle.

FIG. 6 shows a detailed view of the area surrounding radiator opening 22. The front wheel, struts, and fender have been removed in this view to aid visualization. The reader will observe that radiator opening 22 is bounded by two side walls 62 and a top wall 60. A hook block 58 is attached to top wall 60 as shown. A hook block 58 is likewise attached to each side wall 62. The blocks can be attached using many methods, but high-strength double-sided tape is particularly effective. In fact, such blocks often come already attached to such tape. Another hook block 58 is affixed to cowling side 66 (A corresponding block is found on the opposite side).

Figure 7:
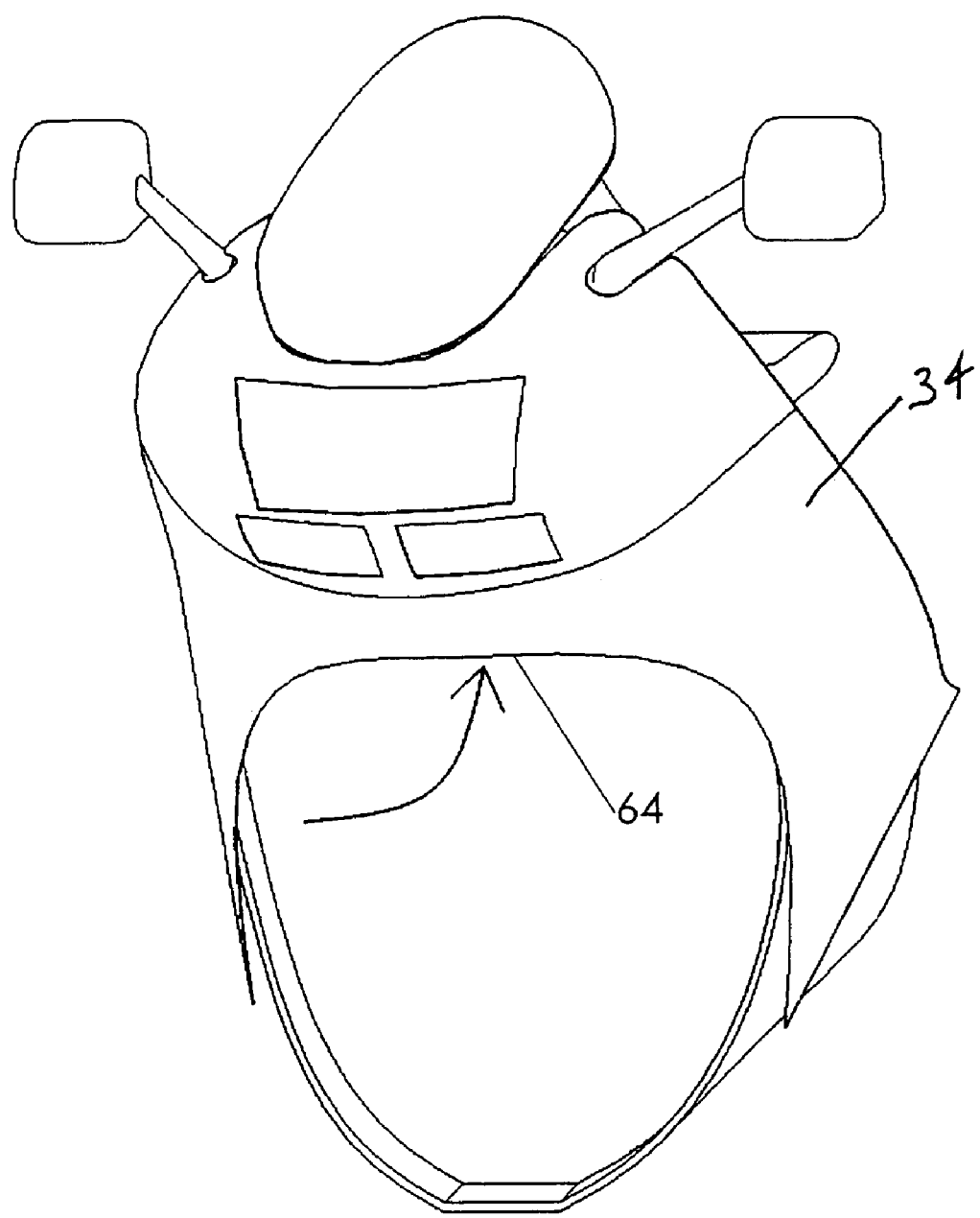
FIG. 7 is an isometric view, showing the installation of the present invention.

FIG. 7 shows the next step in the installation process. With the cowling cover draped over the upper cowling, lower edge 64 of central portion 84 is tucked into the radiator opening. The centrally located loop block 56 is then pressed against the hook block 58 located on top wall 60. This holds the lower extreme of the central portion in place.

Figure 8:
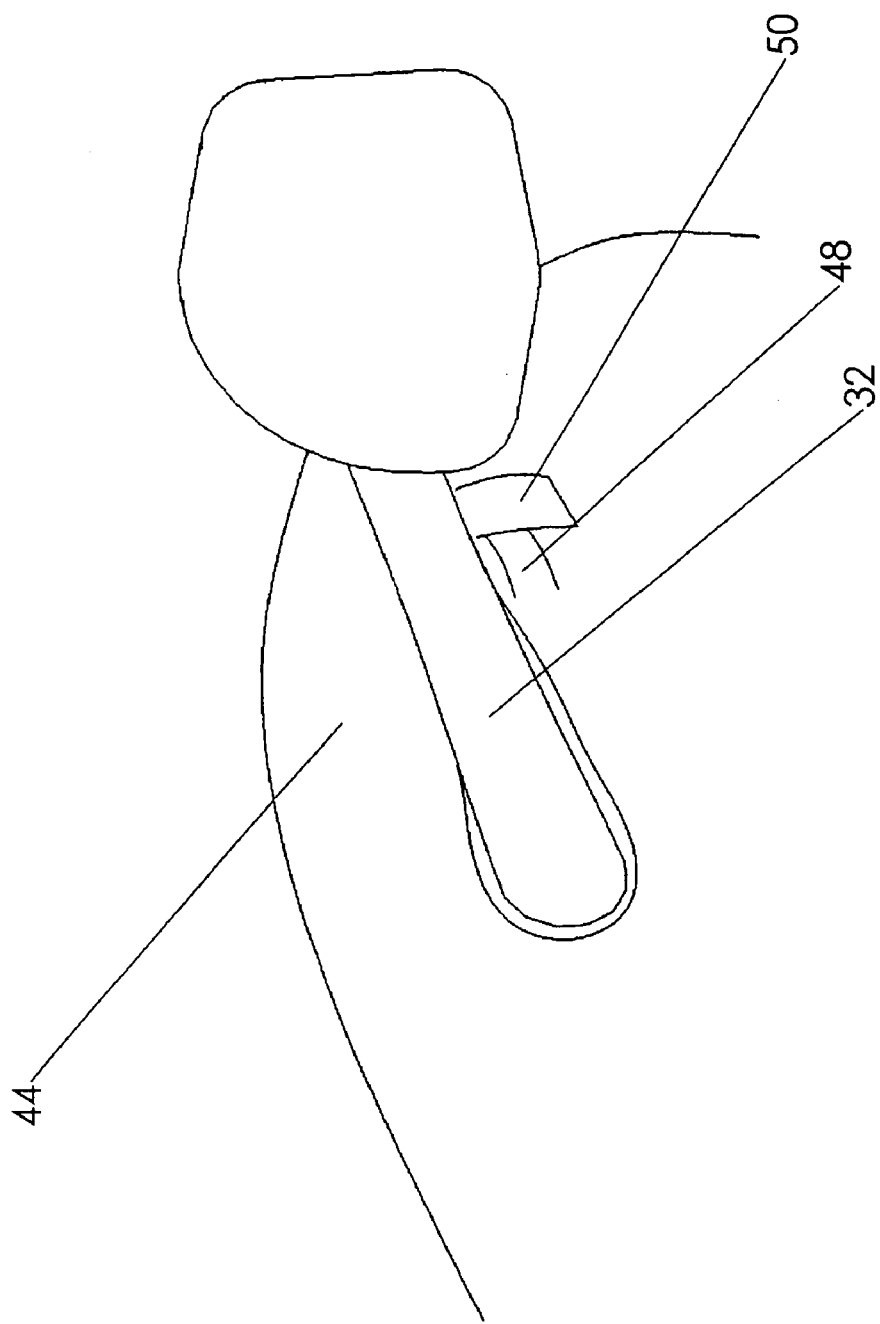
FIG. 8 is an isometric view, showing the installation of the present invention.

Turning now to FIG. 8, the user pulls the cowling cover taut, then locks each stalk slot over each stalk 32 by securing loop tab 50 to hook tab 48 (The adjustable nature of the link between the hook and loop tabs allow the cowling cover to be properly tightened.

Figure 9:
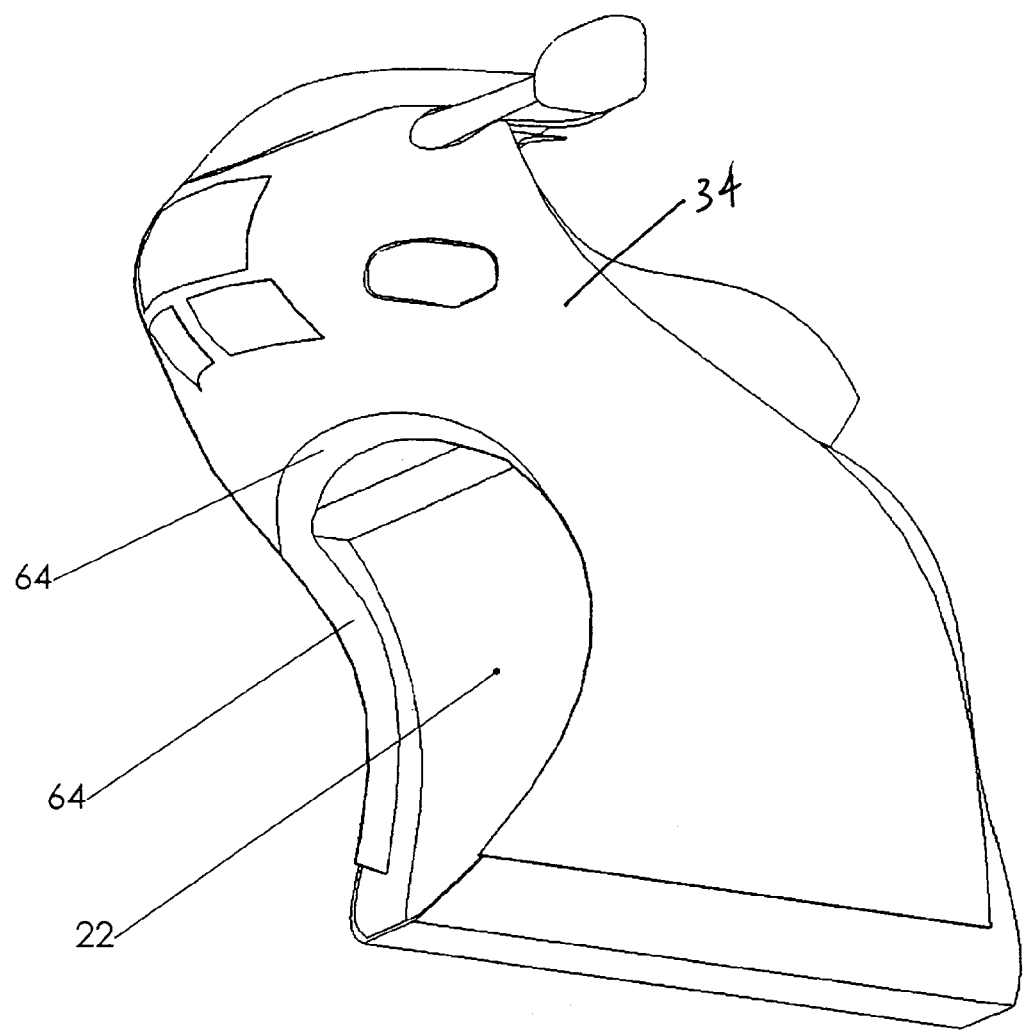
FIG. 9 is an isometric view, showing the installation of the present invention.

FIG. 9 shows the next step. The user tucks lower edge 64 of the two side flaps into radiator opening 22 and secures them in position by pressing the two loop blocks 56 on the side flaps against the two hook blocks 58 on side walls 62. Finally, the user can secure the two upper corners 68 by pressing the two loop blocks 56 on the two upper corners 68 against the two hook blocks 58 on the two cowling sides 66.

Using this approach, the leading surfaces of the upper and lower cowling are well protected. The cowling cover can even incorporate mesh panels covering some or all of headlight opening 36, air intake opening 38, or turn signal opening 40.

However, returning briefly to FIG. 1, the reader will observe that the finished surfaces on fender 18 are not protected by the cowling cover. An additional element is therefore desirable to protect the fender.

Figure 10:
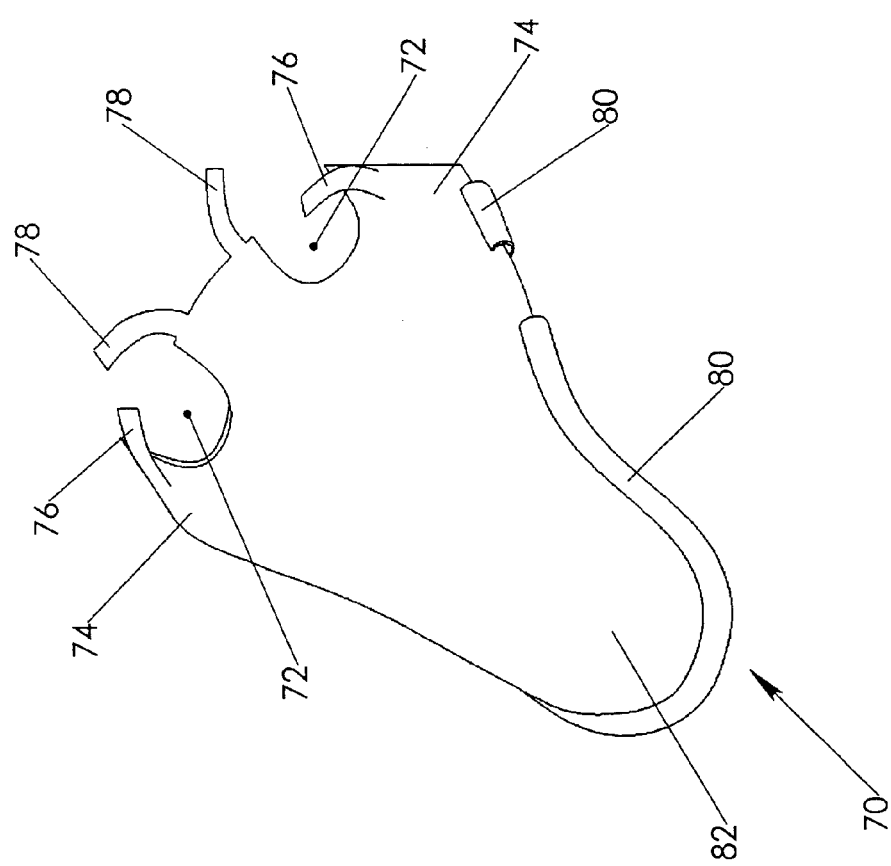
FIG. 10 is an isometric view, showing a fender cover.

FIG. 10 shows fender cover 70. Main panel 82 opens into a pair of strut slots 72 toward the rear. These are selectively closed by cooperating hook tabs 76 and loop tabs 78. A pair of flaps 74 bound the lower portions of the two strut slots 72. Tube section 80 extends around most of the perimeter of main panel 82.

Figure 11:
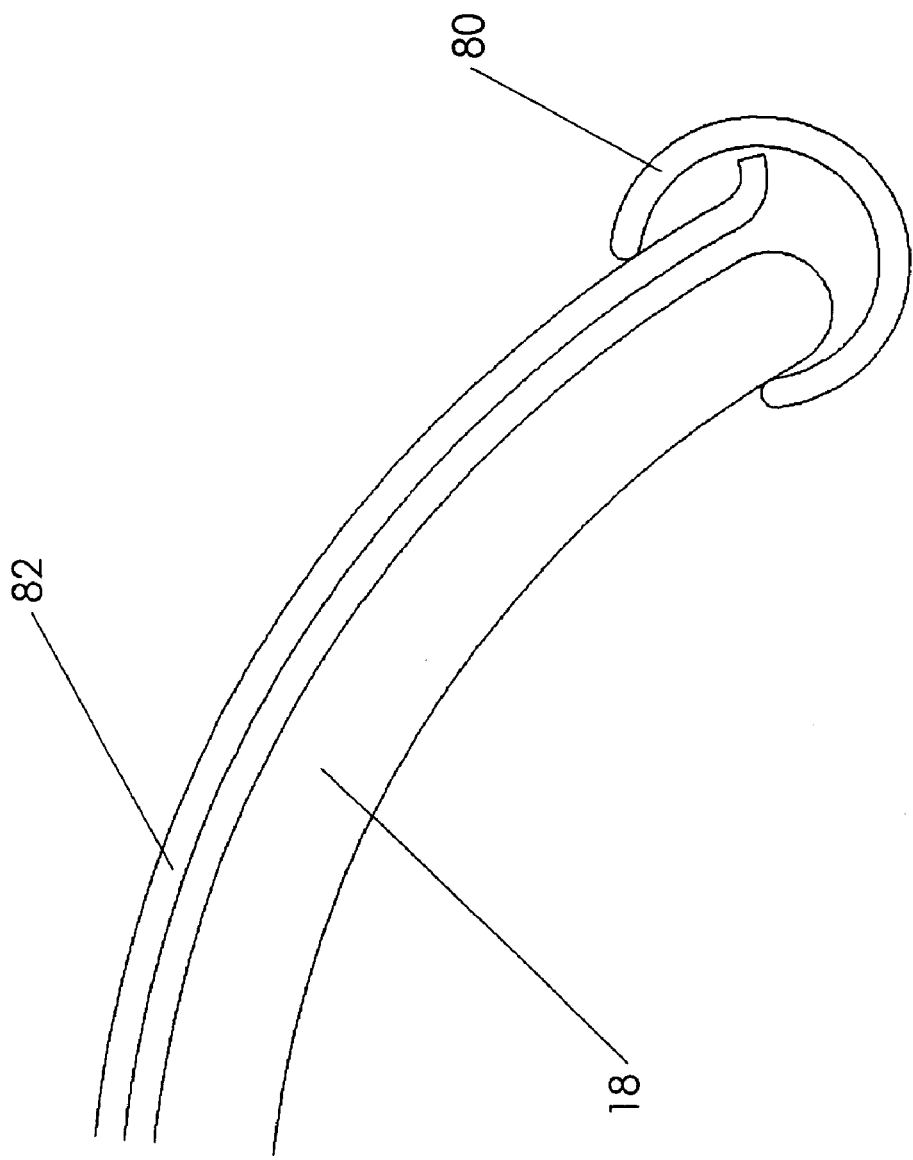
FIG. 11 is a section view, showing features of the fender cover.

FIG. 11 shows a section view through the fender cover in its installed state. Tube section 80 is attached to main panel 82. It is not closed however. It contains a slit along its entire length. The user can pry open this slit and slide it over the exposed edge of fender 18. The tube section, which is made of a pliable material such as rubber, naturally tends to close. It thereby grips the edge of the fender and secures the device in position.

Figure 12:
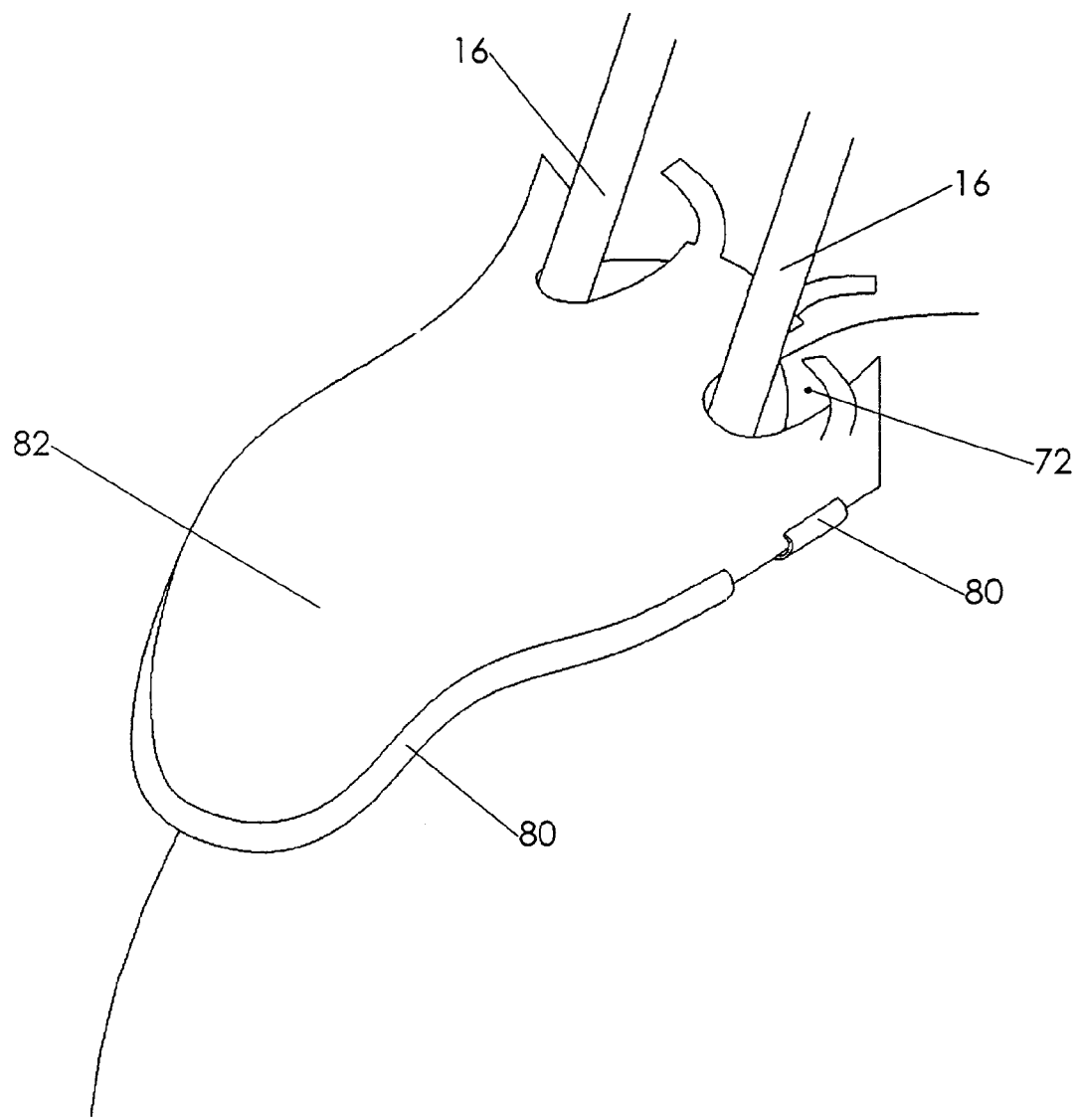
FIG. 12 is an isometric view, showing the installation of the fender cover.
Figure 13:
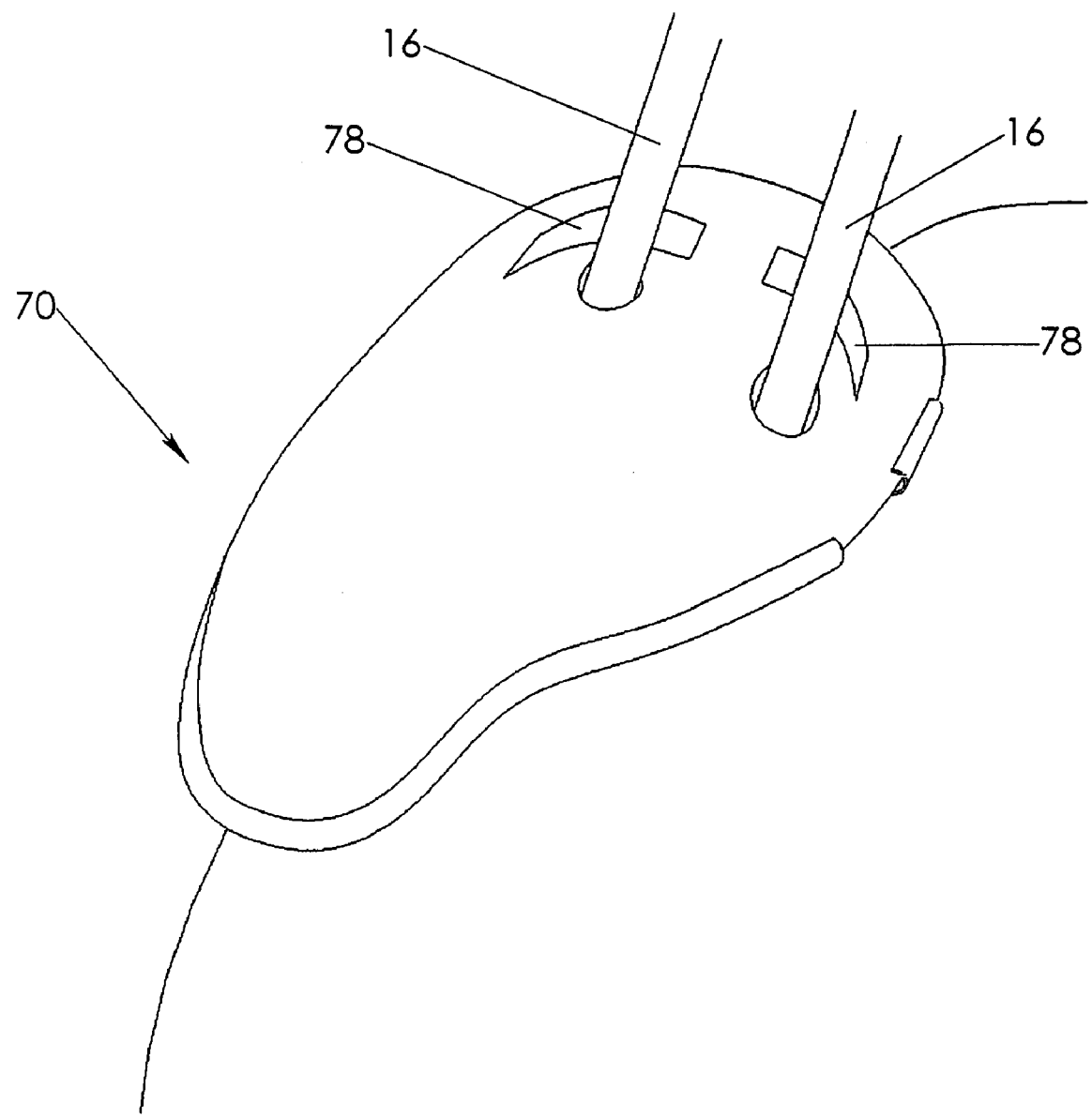
FIG. 13 is an isometric view, showing the installation of the fender cover.

In FIG. 12, the user has slipped the two strut slots 72 around the two struts 116. In FIG. 13, the user has closed the two strut slots by locking the hook and loop tabs together. The small portions of tube section 80 lying near the rear of the cover are then slipped over the edge of the fender guard and the installation is complete.

Figure 14:
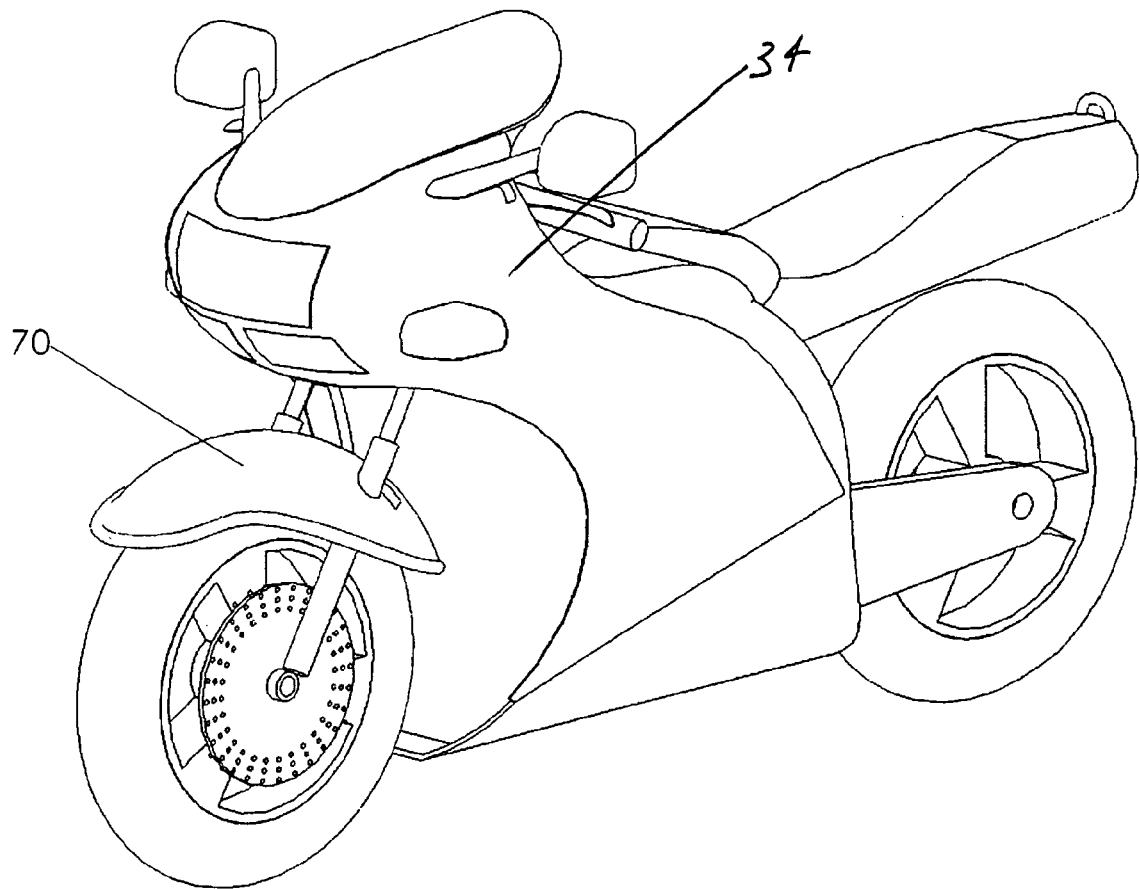
FIG. 14 is a perspective view, showing the motorcycle with the invention installed.

FIG. 14 shows the complete invention installed, with the cowling cover and the fender cover protecting the forward surfaces of the motorcycle.

Although the preceding description contains significant detail, it should not be viewed as limiting the invention but rather as providing examples of the preferred embodiments. Accordingly, the scope of the invention should be fixed by the following claims rather than by any examples given.

Having described my invention, I claim:

1. A motorcycle protective cover for protecting a motorcycle including a first strut; a second strut; and a fender, wherein said fender of said motorcycle has an outer perimeter and an edge around said outer perimeter, comprising:
   i. a main panel, having an outer perimeter;
   ii. a tube section, running along a portion of said outer perimeter of said main panel;
   iii. a first strut slot;
   iv. a second strut slot;

v. means for closing said first strut slot around said first strut; and vi. means for closing said second strut slot around said second strut.

2. The motorcycle protective cover of claim 1, wherein said tube section further comprises a slit.

3. The motorcycle protective cover of claim 2, wherein said slit of said tube section is adapted for receiving said edge of said fender.

4. The motorcycle protective cover of claim 2, wherein said tube section provides elastic clamping force around said slit.

5. The motorcycle protective cover of claim 3, wherein said tube section provides elastic clamping force around said slit.

6. A motorcycle protective cover for protecting a motorcycle including a first strut; a second strut;

and a fender, said fender having an outer perimeter and an edge around said outer perimeter, comprising:

i. a main panel, having an outer perimeter;

ii. a tube section, running along a portion of said outer perimeter of said main panel;

iii. a slit, running along said tube section;

iv. a first strut slot;

v. a second strut slot;

vi. means for closing said first strut slot around said first strut;

vii. means for closing said second strut slot around said second strut; and viii. wherein said tube section provides elastic clamping force around said slit.

7. The motorcycle protective cover of claim 6, wherein said slit of said tube section is adapted for receiving said edge of said fender.

* * * * *